United States Patent [19]

Hamabe

[11] Patent Number: 5,613,200
[45] Date of Patent: Mar. 18, 1997

[54] METHOD OF ALLOCATING RADIO CHANNELS FOR MOBILE COMMUNICATION SYSTEM

[75] Inventor: Kojiro Hamabe, Tokyo, Japan

[73] Assignee: NEC Corporation, Tokyo, Japan

[21] Appl. No.: 487,696

[22] Filed: Jun. 7, 1995

Related U.S. Application Data

[63] Continuation of Ser. No. 214,291, Mar. 17, 1994, abandoned.

[30] Foreign Application Priority Data

Mar. 17, 1993 [JP] Japan .................... 5-081101

[51] Int. Cl.$^6$ ....................................... H04Q 7/36
[52] U.S. Cl. ............... 455/33.1; 455/341; 455/62; 455/63
[58] Field of Search ................. 455/33.1, 34.1, 455/62, 63, 34.2, 33.4, 56.1; 379/59, 58

[56] References Cited

U.S. PATENT DOCUMENTS

| | | | |
|---|---|---|---|
| 4,128,740 | 12/1978 | Graziano | 455/33.1 |
| 5,038,399 | 8/1991 | Bruckert | 455/34.1 |
| 5,111,534 | 5/1992 | Benner | 455/34.1 |
| 5,212,830 | 5/1993 | Miller | 455/33.1 |
| 5,233,643 | 8/1993 | Naeini et al. | 455/34.1 |
| 5,257,398 | 10/1993 | Schaeffe | 455/33.1 |
| 5,379,447 | 1/1995 | Bonta et al. | 455/56.1 |
| 5,437,054 | 7/1995 | Rappaport et al. | 455/34.1 |
| 5,448,761 | 9/1995 | Ushirokawa | 455/62 |

FOREIGN PATENT DOCUMENTS

| | | |
|---|---|---|
| 0359535 | 3/1990 | European Pat. Off. |
| 0430173 | 6/1991 | European Pat. Off. |
| 0544095 | 6/1993 | European Pat. Off. |

OTHER PUBLICATIONS

Nordic Seminar on Digital Land Mobile Radiocommunication, 5 Feb. 1985, pp. 209–217, Sternvall, "Calculation of the Capacity and Co–Channel Interference in a Cellular System".

Bell System Technical Journal, vol. 62, No. 7, Sep. 1983, pp. 2037–2065, Sunberg, "Alternative Cell Configurations for Digital Mobile Radio Systems".

42nd Vehicular Technology Society Conference, vol. 1, 10 May 1992, pp. 37–42, Lee, "Efficiency of a New Microcell System".

*Primary Examiner*—Edward F. Urban
*Attorney, Agent, or Firm*—Sughrue, Mion, Zinn, Macpeak & Seas

[57] ABSTRACT

Each of a plurality of base stations in a mobile radio communication system has a plurality of sectoral zones each having a directional antenna of horizontal directivity pattern. Radio channels are divided into as many groups as the number of sectoral zones per base station. The channel groups are assigned to the sectoral zones as the preferential allocation channel groups in such a manner that the same channel groups are assigned to the sectoral zones which have substantially the same directions determined by antenna directivity. When a request for communication occurs within a sectoral zone, channels are selected from the channel group assigned to the sectoral zone. If the carrier-to-interference power ratio of a selected channel is equal to or greater than a predetermined value, the selected channel is allocated. The mobile radio communication system thus has improved channel utilization efficiency to accommodate more traffic.

10 Claims, 11 Drawing Sheets

| CHANNEL GROUP | CHANNELS |
|---|---|
| CHG 1 | 1. 4. 7. 10 |
| CHG 2 | 2. 5. 8. 11 |
| CHG 3 | 3. 6. 9. 12 |

| SECTORAL ZONE | SELECTION ORDER OF CHANNEL GROUPS |
|---|---|
| X1 | ①CHG 1. ②CHG 2 OR CHG 3 |
| X2 | ①CHG 2. ②CHG 3 OR CHG 1 |
| X3 | ①CHG 3. ②CHG 1 OR CHG 2 |

X=A. B. C. D. E. F. G

| CHANNEL GROUP | CHANNELS |
|---|---|
| CHG 1 | 1. 4. 7. 10 |
| CHG 2 | 2. 5. 8. 11 |
| CHG 3 | 3. 6. 9. 12 |

| SECTORAL ZONE | SELECTION ORDER OF CHANNEL GROUPS |
|---|---|
| X1 | ①CHG 1. ②CHG 2 OR CHG 3 |
| X2 | ①CHG 2. ②CHG 3 OR CHG 1 |
| X3 | ①CHG 3. ②CHG 1 OR CHG 2 |

X = A. B. C

| SECTORAL ZONE | CHANNELS |
|---|---|
| X1 | 1, 4, 7, 8, 10 |
| X2 | 2, 5, 7, 9, 10 |
| X3 | 3, 6, 8, 9, 10 |

X = A, B, C, D, E, F, G

| SECTORAL ZONE | SELECTION ORDER OF SUB-GROUPS OF CHANNELS |
|---|---|
| X1 | ① 1 OR 4  ② 7 OR 8  ③ 10 |
| X2 | ① 2 OR 5  ② 7 OR 9  ③ 10 |
| X3 | ① 3 OR 6  ② 8 OR 9  ③ 10 |

X = A, B, C, D, E, F, G

| SECTORAL ZONE | CHANNELS |
|---|---|
| X1 | 1. 4. 7. 8. 10 |
| X2 | 2. 5. 7. 9. 10 |
| X3 | 3. 6. 8. 9. 10 |

X = A. B. C

| SECTORAL ZONE | SELECTION ORDER OF SUB-GROUPS OF CHANNELS |
|---|---|
| X1 | ① 1 OR 4 ② 7 OR 8 ③ 10 |
| X2 | ① 2 OR 5 ② 7 OR 9 ③ 10 |
| X3 | ① 3 OR 6 ② 8 OR ⑨ 3 10 |

X = A. B. C

| CHANNEL GROUP | CHANNELS |
|---|---|
| CHG 1 | 1. 4. 7. 10 |
| CHG 2 | 2. 5. 8. 11 |
| CHG 3 | 3. 6. 9. 12 |

| SECTORAL ZONE | SELECTION ORDER OF CHANNEL GROUPS |
|---|---|
| X1 | ①CHG 1. ②CHG 2. ③CHG 3 |
| X2 | ①CHG 2. ②CHG 3. ③CHG 1 |
| X3 | ①CHG 3. ②CHG 1. ③CHG 2 |

X = A. B. C. D. E. F. G

| CHANNEL GROUP | CHANNELS |
|---|---|
| CHG 1 | 1. 4. 7. 10 |
| CHG 2 | 2. 5. 8. 11 |
| CHG 3 | 3. 6. 9. 12 |

| SECTORAL ZONE | SELECTION ORDER OF CHANNEL GROUPS |
|---|---|
| X1 | ①CHG 1. ②CHG 2. ③CHG 3 |
| X2 | ①CHG 2. ②CHG 3. ③CHG 1 |
| X3 | ①CHG 3. ②CHG 1. ③CHG 2 |

X = A. B. C

| CHANNEL GROUP | CHANNELS |
|---|---|
| CHG1 | 1. 7. 13 |
| CHG2 | 2. 8. 14 |
| CHG3 | 3. 9. 15 |
| CHG4 | 4. 10. 16 |
| CHG5 | 5. 11. 17 |
| CHG6 | 6. 12. 18 |

| SECTORAL ZONE | SELECTION ORDER OF CHANNEL GROUPS |
|---|---|
| X1 | CHG1. CHG2. CHG6. CHG3. CHG5. CHG4 |
| X2 | CHG2. CHG3. CHG1. CHG4. CHG6. CHG5 |
| X3 | CHG3. CHG4. CHG2. CHG5. CHG1. CHG6 |
| X4 | CHG4. CHG5 CHG3. CHG6. CHG2. CHG1 |
| X5 | CHG5. CHG6. CHG4. CHG1. CHG3. CHG2 |
| X6 | CHG6. CHG1. CHG5. CHG2. CHG4. CHG3 |

X = A. B. C

| CHANNEL GROUP | CHANNELS |   |    |
|---|---|---|---|
| CHG1 | 1. | 7. | 13 |
| CHG2 | 2. | 8. | 14 |
| CHG3 | 3. | 9. | 15 |
| CHG4 | 4. | 10. | 16 |
| CHG5 | 5. | 11. | 17 |
| CHG6 | 6. | 12. | 18 |

| SECTORAL ZONE | SELECTION ORDER OF CHANNEL GROUPS |   |   |   |   |   |
|---|---|---|---|---|---|---|
| X1 | CHG1. | CHG2. | CHG6. | CHG3. | CHG5. | CHG4 |
| X2 | CHG2. | CHG3. | CHG1. | CHG4. | CHG6. | CHG5 |
| X3 | CHG3. | CHG4. | CHG2. | CHG5. | CHG1. | CHG6 |
| X4 | CHG4. | CHG5. | CHG3. | CHG6. | CHG2. | CHG1 |
| X5 | CHG5. | CHG6. | CHG4. | CHG1. | CHG3. | CHG2 |
| X6 | CHG6. | CHG1. | CHG5. | CHG2. | CHG4. | CHG3 |

X = A. B. C

METHOD OF ALLOCATING RADIO CHANNELS FOR MOBILE COMMUNICATION SYSTEM

This is a Continuation of Application Ser. No. 08/214,291 filed Mar. 17, 1994 now abandoned.

BACKGROUND OF THE INVENTION

1. Field of the Invention

The present invention relates to a method of allocating radio channels for a cellular radio communication system in which each base station covers a plurality of sectoral zones with a plurality of antennas each having a sectoral directivity pattern in a horizontal plane.

2. Description of the Prior Art

Mobile communication systems such as automobile telephone systems employ the same channel repeatedly in zones which are free from mutual interference for effective utilization of frequencies. There are available two channel allocation methods, i.e., the fixed channel allocation method and the dynamic channel allocation method. According to the fixed channel allocation method, specified channels are fixedly allocated to each zone in view of interference conditions. According to the dynamic channel allocation method, channels are not allocated to each zone in a fixed manner, but a base station selects one of all channels per communication request, measures the carrier-to-interference power ratio (hereinafter referred to as "CIR") of the selected channel, and allocates the selected channel if the measured CIR is higher than a predetermined threshold value (hereinafter referred to as "CIR threshold value"). With the dynamic channel allocation method, channels can effectively be utilized by a jumbo group effect that is achieved when all base stations share and allocate all channels. Further, since a channel can repeatedly be used if the CIR threshold value is satisfied, the dynamic channel allocation method can realize a shorter distance of repeated use of the same channel than the fixed channel allocation method. Therefore, the dynamic channel allocation method has a higher frequency utilization efficiency than the fixed channel allocation method.

Zones of mobile communication systems may be arranged in either an omnidirectional zone configuration or a sectoral zone configuration. In the omnidirectional zone configuration, a base station has an antenna having an omnidirectional directivity pattern in a horizontal plane, and one zone around one antenna is covered by one base station. In the sectoral zone configuration, a base station has a plurality of antennas each having a sectoral directivity pattern in a horizontal plane, and a plurality of sectoral zones are covered by this base station. Since the same channel interference is low due to the antenna directivity, and the distance for repeatedly using the same channel is shorter than in the omnidirectional zone configuration, the sectoral zone configuration has a higher frequency utilization efficiency than the omnidirectional zone configuration.

Heretofore, the sectoral zone configuration has been used in combination with the fixed channel allocation method. Channel allocation patterns available for this combination include the parallel beam channel allocation pattern and the back-back beam channel allocation pattern. See, for example, "Automobile Telephone" by Moriji Kuwabara, Electronic Information Communication Society, 1985, pages 79–83. FIG. 12(a) of the accompanying drawings shows the parallel beam channel allocation pattern. In FIG. 12(a), there are three base stations A, B, C, and the same channel is allocated to sectoral zones A1, C1 of the same direction which are covered by base stations A, C spaced a certain distance from each other. FIG. 12(b) of the accompanying drawings shows the back-back beam channel allocation pattern. In FIG. 12(b), there are three base stations A, B, C, and the same channel is allocated to sectoral zones A1, B1, C1 which extend in directions opposite to the directions to the specified area.

According to the parallel beam channel allocation pattern, since the same channel is used in those sectoral zones whose antenna directivity is in the same direction, it is highly probable that a major interference wave will arrive in the same direction as that of a desired carrier wave. In actual propagation environments, since major factors which determine variations of the central values of carrier and interference waves are ground configurations and objects in the direction in which the carrier and interference waves arrive, the carrier and interference waves are highly correlated to each other if they arrive in the same direction (see "Propagation Correlations at 900 MHz" by V. Graziano, IEEE Trans. on Vehicular Technology VT-27, No. 4, November, 1978). Accordingly, in the parallel beam channel allocation pattern, where the level of a carrier wave is low, it is highly probable that the level of an interference wave is also low, with the result that the CIR may not be readily decreased. Further, since interference in the direction perpendicular to the antenna directivity is small, the CIR may not be readily decreased.

The back-back beam channel allocation pattern is advantageous if regions of large traffic are limited, because the distance for repeatedly using the same channel is locally shortened.

While the sectoral zone configuration has heretofore been used in combination with the fixed channel allocation method, as described above, it has also been proposed to use the sectoral zone configuration in combination with the dynamic channel allocation method for much higher frequency utilization efficiency (see "Adaptive Channel Allocation in a TIA IS-54 System" by H. Andersson, H. Eriksson, A. Fallgren, and M. Madfors, 1992 Vehicular Technology Conference, pages 778–781).

For dynamic channel allocation in the omnidirectional zone configuration, a channel is selected from all channels and allocated per base station. For dynamic channel allocation in the sectoral zone configuration, it may be possible to select a channel from all channels and allocate the selected channel per sectoral zone. The combination of the sectoral zone configuration and the dynamic channel allocation method would achieve the advantage of reduced interference in the same channel due to the sectoral zone configuration and the advantage of the dynamic channel allocation method but would fail to obtain the advantages of the parallel beam channel allocation pattern and the back-back beam channel allocation pattern.

SUMMARY OF THE INVENTION

It is an object of the present invention to provide a method of allocating radio channels by way of dynamic channel allocation for higher frequency utilization efficiency based on the advantages of the parallel beam channel allocation pattern and the back-back beam channel allocation pattern in a mobile communication system of the sectoral zone configuration.

According to the present invention, there is provided a method of allocating radio channels in a mobile communication system comprising the steps of providing in each of the base stations a plurality of sectoral zones each having a direction defined by a directional antenna, dividing all of the radio channels into as many channel groups as the number of sectoral zones per base station, assigning the same channel group as the preferential allocation channel group to each sectoral zone whose direction is substantially the same, and when a request for communication occurs between a base station and a mobile station positioned in a sectoral zone covered by the base station, selecting radio channels from the preferential allocation channel group assigned to the sectoral zone, and allocating the selected radio channel which has a carrier-to-interference power ratio equal to or greater than a predetermined value, whereby a number of identical radio channels can be allocated to those sectoral zones having substantially the same direction in many of the base stations.

If there is no allocable channel in the preferential allocation channel group, radio channels may be selected from the preferential allocation channel groups assigned to the different sectoral zones.

When some of the radio channels are assigned overlappingly to different preferential allocation channel groups, and when radio channels are selected from one preferential allocation channel group, they may be selected in order from the channels which are assigned to the smallest number of the preferential allocation channel groups.

When radio channels are selected from the preferential allocation channel groups assigned to the different sectoral zones, the radio channels may be selected in the same order in those sectoral zones whose directions are substantially the same.

When radio channels are selected from the preferential allocation channel groups assigned to different sectoral zones, the radio channels may be selected in order from the preferential allocation channel groups assigned to sectoral zones having the least difference in direction.

There is also provided a method of allocating radio channels in a mobile communication system comprising the steps of providing in each of the base stations a plurality of sectoral zones each having a direction defined by a directional antenna, dividing all of the radio channels into as many channel groups as the number of sectoral zones per base station, assigning the same channel group as the preferential allocation channel group to each sectoral zone where, as for at least two of the base stations which are relatively close to each other, angles formed between the directions of sectoral zones and the directions toward a given region from each base station are substantially the same, and when a request for communication occurs between a base station and a mobile station positioned in a sectoral zone covered by the base station, selecting radio channels from the preferential allocation channel group assigned to the sectoral zone, and allocating the selected radio channel which has a carrier-to-interference power ratio equal to or greater than a predetermined value, whereby a number of identical radio channels can be allocated to those sectoral zones where the angles are substantially similar to each other.

If there is no allocable channel in the preferential allocation channel group, radio channels may be selected from the preferential allocation channel groups assigned to different sectoral zones.

When some of the radio channels are assigned overlappingly to different preferential allocation channel groups, and when radio channels are selected from one preferential allocation channel group, they may be selected in order from the channels which are assigned to the smallest number of the preferential allocation channel groups.

When radio channels are selected from the preferential allocation channel groups assigned to different sectoral zones, the radio channels may be selected in the same order in those sectoral zones where said angles are substantially the same.

When radio channels are selected from the preferential allocation channel groups assigned to different sectoral zones, the radio channels may be selected in order from the preferential allocation channel groups assigned to the sectoral zones having the least difference in direction.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
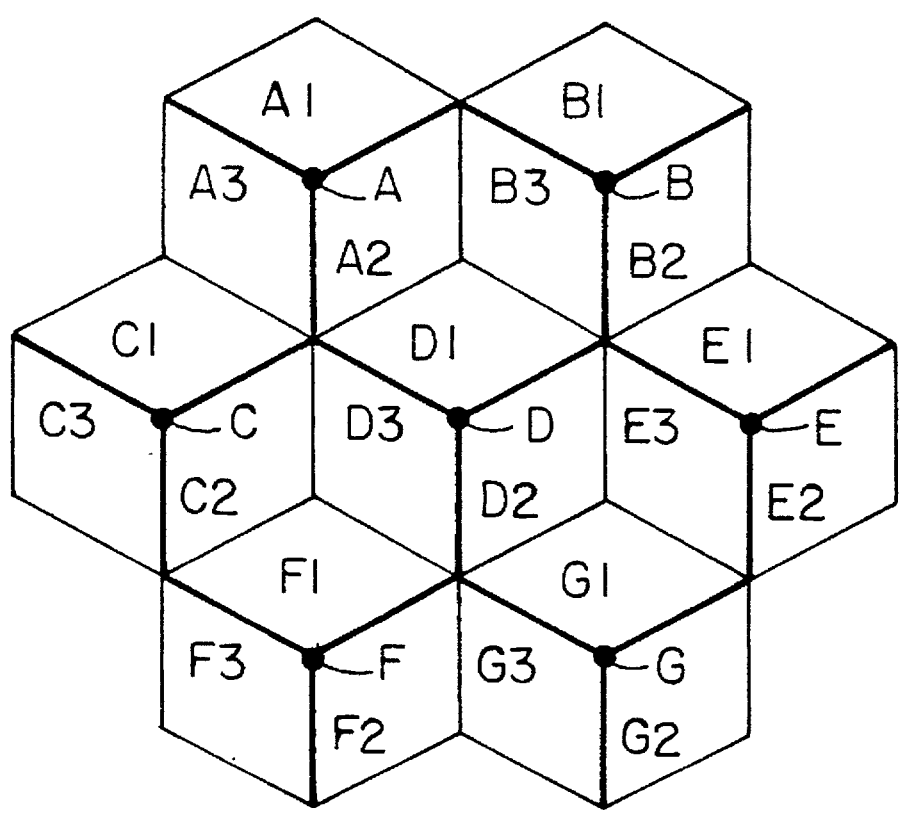
FIG. 1 shows a zone configuration of a mobile communication system to which the radio channel allocation method according to the first invention is applied and a plan of the preferential allocation channel groups assigned to sectoral zones.

FIG. 1 shows a zone configuration of a mobile communication system to which a radio frequency channel allocation method according to a first invention is applied and a plan of the preferential allocation channel groups assigned to sectoral zones. The mobile communication system has a plurality of base stations A, B, C, . . . , G in its service area, and a plurality of sectoral zones A1, A2, A3, B1, B2, B3, . . . , G1, G2, G3 which are covered by respective base stations A, B, C, . . . , G. There are available 12 channels 1, 2, . . . , 12 in the mobile communication system. Base station A has a plurality of antennas each having a sectoral directivity pattern in a horizontal plane, the antennas being directed toward sectoral zones A1, A2, A3. The sectoral zones B1, B2, B3 covered by base station B are arranged such that they have sectoral antenna directivity directions which are substantially the same as those in sectoral zones A1, A2, A3. The sectoral zones covered by the base stations C–G are also similarly arranged.

Since three sectoral zones A1, A2, A3 belong to base station A, channels 1–12 are divided into three groups that are assigned as the preferential allocation channel groups to each of sectoral zones A1, A2, A3. For example, channels 1, 4, 7, 10 make up a preferential allocation channel group assigned to sectoral zone A1, channels 2, 5, 8, 11 make up a preferential allocation channel group assigned to sectoral zone A2, and channels 3, 6, 9, 12 make up a preferential allocation channel group assigned to sectoral zone A3. Since the direction of antenna directivity in sectoral zone B1 covered by base station B is substantially the same as that in sectoral zone A1, the channel group assigned to sectoral zone B1 includes mostly the same channels as those assigned to sectoral zone A1. Specifically, the preferential allocation channel group assigned to sectoral zone B1 includes channels 1, 4, 7, 10. Similarly, the preferential allocation channel group assigned to sectoral zone B2 includes channels 2, 5, 8, 11, and the preferential allocation channel group assigned to sectoral zone B3 includes channels 3, 6, 9, 12. Likewise, the preferential allocation channel groups assigned to each of the sectoral zones C1, D1, . . . , G1 are the same as the preferential allocation channel group assigned to sectoral zone A1, the preferential allocation channel groups assigned to each of the respective sectoral zones C2, D2, . . . , G2 are the same as the preferential allocation channel group assigned to sectoral zone A2, and the preferential allocation channel groups assigned to the each of the sectoral zones C3, D3, . . . , G3 are the same as the preferential allocation channel group assigned to sectoral zone A3.

Therefore, since those sectoral zones which have substantially the same direction (defined by antenna directivity) share the same preferential allocation channels, the desired carrier and main interference waves arrive in substantially the same direction, with the result that the desired carrier and interference wave levels are highly correlated to each other. Thus, the CIR is less likely to become lower than the CIR threshold value, with the result that the interval for repeatedly using the same channel in the direction of antenna directivity can be shortened. Since the interference is small between the radio waves in the direction of antenna directivity and the direction perpendicular to the above direction, it is also possible to shorten the distance for repeatedly using the same channel in that direction. Therefore, channel utilization efficiency increases. Since the channels are divided into as many preferential allocation channel groups as the number of sectoral zones per base station and the allocating channels are selected from the channel groups, the division loss is greater than in the case in which the preferential allocation channels are shared with all the sectoral zones A1–G3. However, when there are a large number of channels available, overall channel utilization efficiency is increased because the above-described advantage of the parallel beam channel allocation pattern is greater than the disadvantage by the division loss.

Figure 2:
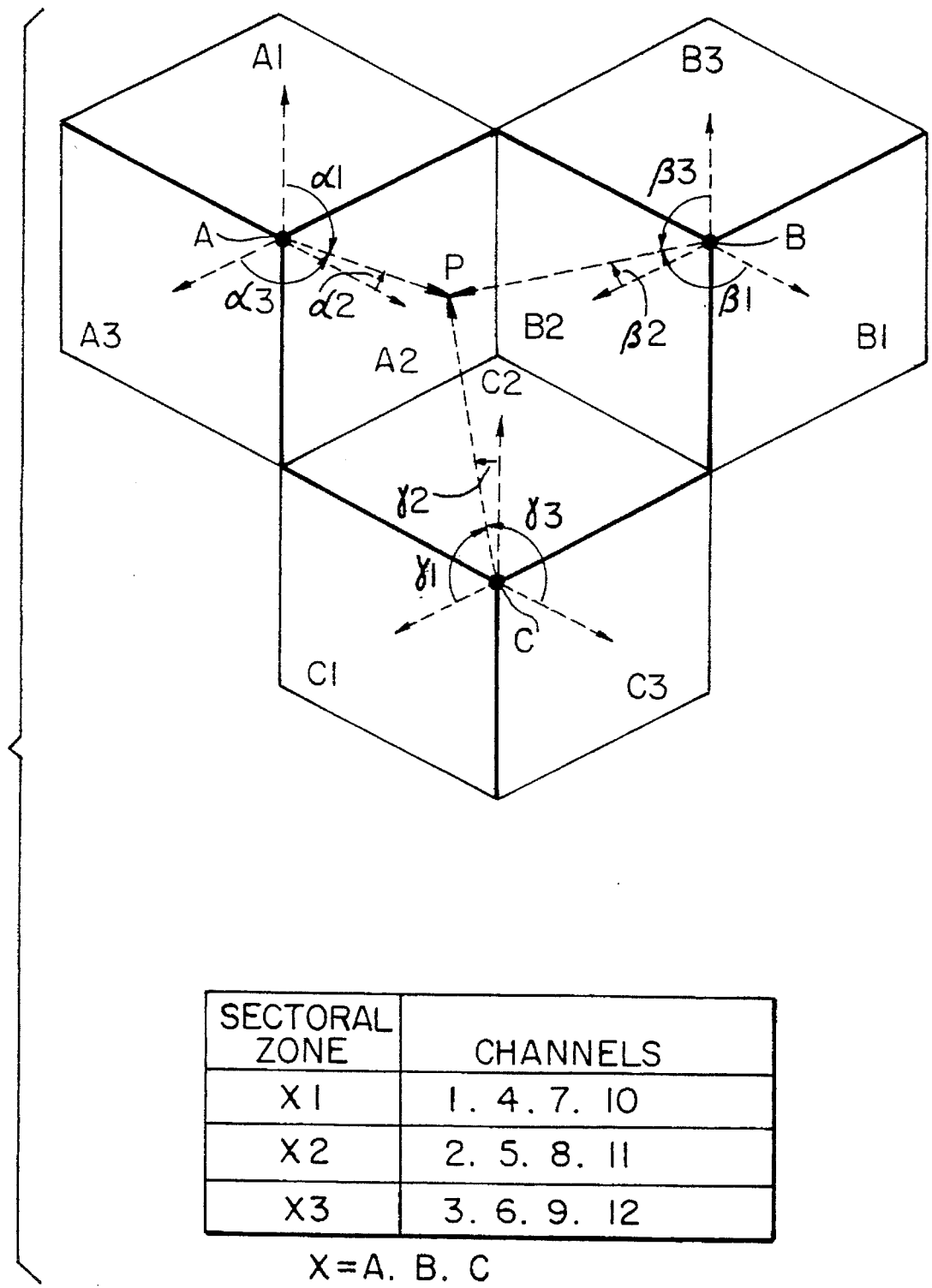
FIG. 2 shows a zone configuration of a mobile communication system to which the radio channel allocation method according to the second invention is applied and a plan of the preferential allocation channel groups assigned to sectoral zones.

FIG. 2 shows a zone configuration of a mobile communication system to which a radio channel allocation method according to a second invention is applied and a plan of the preferential allocation channel groups assigned to sectoral zones. The mobile communication system has a plurality of base stations A, B, C, and a plurality of sectoral zones A1, A2, A3, B1, B2, B3, C1, C2, C3 which are covered by the respective base stations A, B, C. There are available 12 channels 1, 2, . . . , 12 in the mobile communication system. The base station A has a plurality of antennas each having a sectoral directivity pattern in a horizontal plane, the antennas being directed toward each of sectoral zones A1, A2, A3. Sectoral zones B1, B2, B3 covered by base station B are arranged such that they have sectoral antenna directivity directions which are substantially the same as those in sectoral zones A2, A3, A1. Sectoral zones C1, C2, C3 covered by base station C are arranged such that they have sectoral antenna directivity directions which are substantially the same as those in sectoral zones A3, A1, A2. Since three sectoral zones A1, A2, A3 belong to base station A, channels 1–12 are divided into three groups that are assigned as preferential allocation channel groups to each of sectoral zones A1, A2, A3. For example, channels 1, 4, 7, 10 make up a preferential allocation channel group assigned to sectoral zone A1, channels 2, 5, 8, 11 make up a preferential allocation channel group assigned to sectoral zone A2, and channels 3, 6, 9, 12 make up a preferential allocation channel group assigned to sectoral zone A3.

It is assumed that the direction from base station A toward an intensive traffic point P is angularly spaced from the antenna directivity direction of sectoral zone A1 by an angle $\alpha1$, the direction from base station B toward the intensive traffic point P is angularly spaced from the antenna directivity direction of sectoral zone B1 by an angle $\beta1$, and other angles $\alpha2$, $\alpha3$, $\beta2$, $\beta3$ are similarly defined. If all the sectoral zones are rhombus-shaped and the point P is positioned inside a triangle ABC (not including its boundary), then the above angles satisfy the following inequalities:

$$90° < \alpha 1 < 150°$$

$$-30° < \alpha 2 < 30°$$

$$-150° < \alpha 3 < 90°$$

$$90° < \beta 1 < 150°$$

$$-30° < \beta 2 < 30°$$

$$-150° < \beta 3 < -90°$$

From the above inequalities, since the difference between angles $\alpha 1$, $\beta 1$ is smaller than 60° and both the differences between angles $\alpha 1$, $\beta 2$ and between angles $\alpha 1$, $\beta 3$ are greater than 60°, any of angles $\beta 1$, $\beta 2$, $\beta 3$ whose difference with angle $\alpha 1$ is the smallest is angle $\beta 1$.

Therefore, in order that the channels allocated to sectoral zones A1 and B1 may include mostly the same channels, the same preferential allocation channel group is assigned to sectoral zones A1 and B1 which include channels 1, 4, 7, 10. Similarly, the preferential allocation channel group assigned to sectoral zones A2 and B2 includes channels 2, 5, 8, 11, and the preferential allocation channel group assigned to sectoral zones A3 and B3 includes channels 3, 6, 9, 12. Like-wise, the preferential allocation channel group assigned to sectoral zone C1 includes channels 1, 4, 7, 10, the channel group assigned to sectoral zone C2 includes channels 2, 5, 8, 11, and the channel group assigned to sectoral zone C3 includes channels 3, 6, 9, 12.

Consequently, those sectoral zones of the different base stations whose directions are angularly spaced from the direction toward the intensive traffic region from each of the base stations by substantially the similar angles share the same preferential allocation channel group. More specifically, those sectoral zones whose directions are opposite the intensive traffic region share a preferential allocation channel group, and those sectoral zones whose directions are oriented toward the intensive traffic region also share another preferential allocation channel group. Therefore, in those sectoral zones whose directions are opposite the intensive traffic region, the same channel can be reused with a shorter distance than in the other sectoral zones. Since the number of channels that can be used in those sectoral zones whose directions are opposite the intensive traffic region may be small, the number of channels that can be used in those sectoral zones whose directions are oriented toward the intensive traffic region may be increased, with the result that the channel utilization efficiency in the intensive traffic region may be improved.

Figure 3:
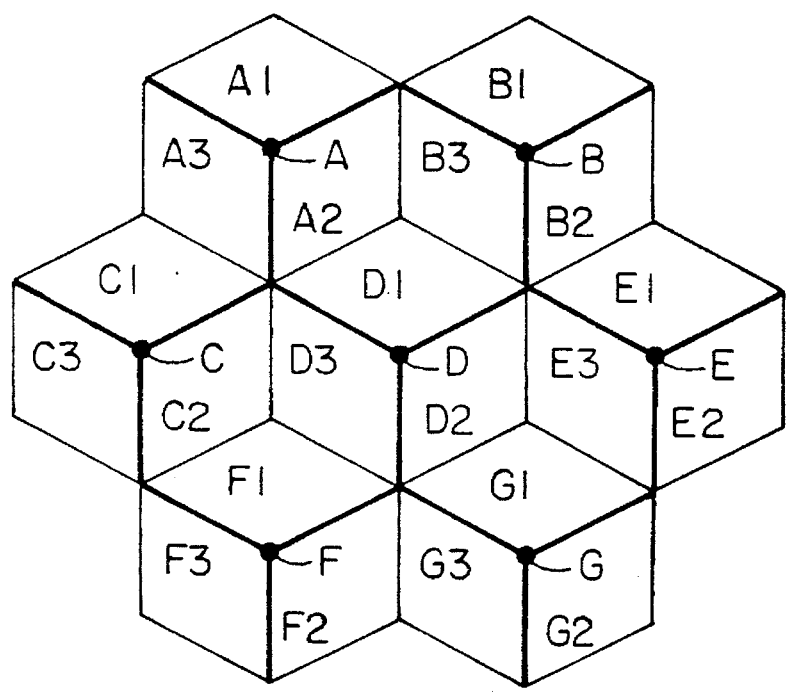
FIG. 3 shows a zone configuration of a mobile communication system to which the radio channel allocation method according to the third invention is applied and a plan of the preferential allocation channel groups assigned to sectoral zones including a selection order of the channel groups.

FIG. 3 shows a zone configuration of a mobile communication system to which a method of allocating radio channels according to a third invention is applied, a plan of the preferential allocation channel groups assigned to sectoral zones and the orders of selection of the preferential allocation channel groups in the sectoral zones. The zone configuration of the mobile communication system and the preferential allocation channel groups that are assigned to each of the sectoral zones, i.e., channel group CHG1 assigned to sectoral zone X1 (X=A, B, C, , G), channel group CHG2 assigned to sectoral zone X2, and channel group CHG3 assigned to sectoral zone X3, are identical to those shown in FIG. 1.

Figure 11:
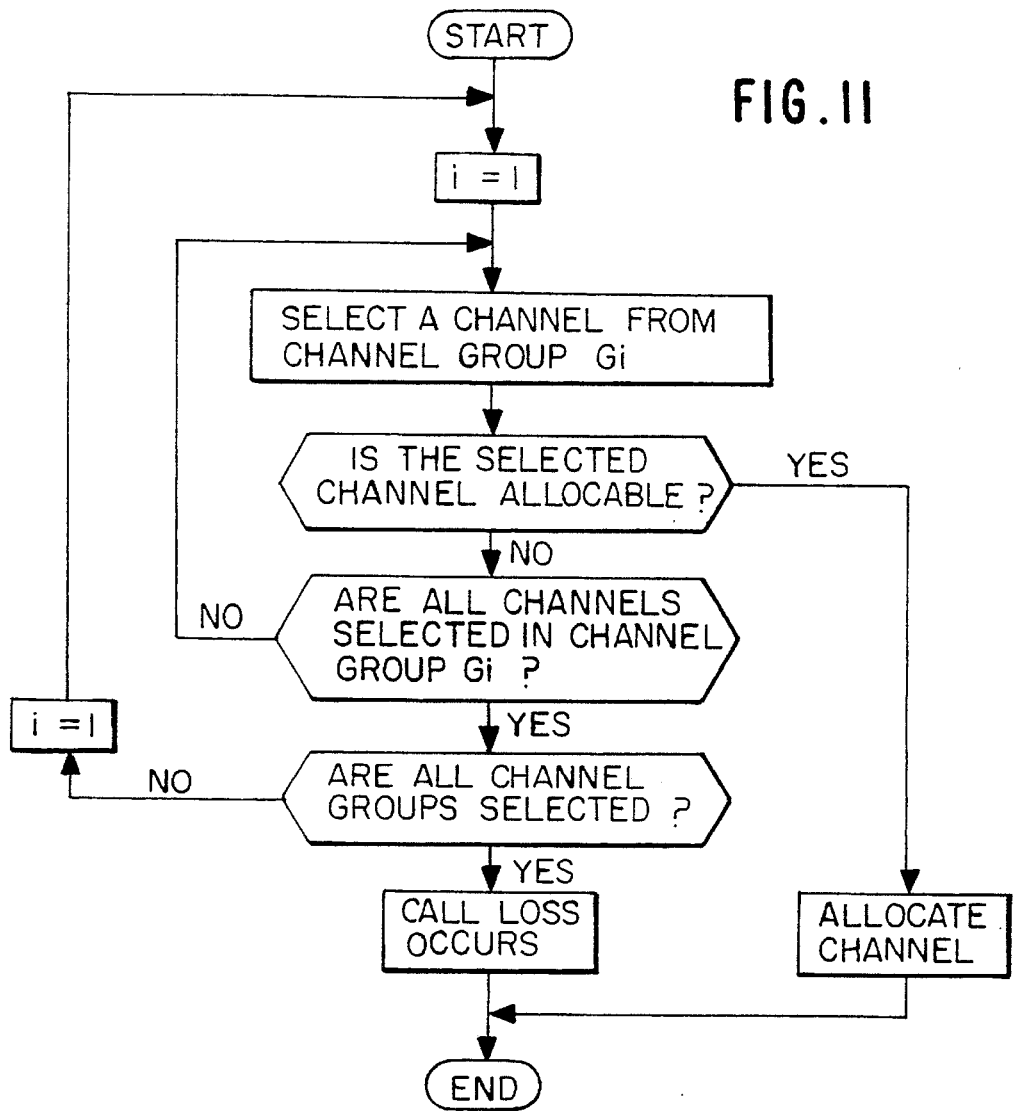
FIG. 11 is a flowchart of a channel allocation algorithm for the embodiments of the methods according to the third through tenth inventions.
Figure 12A:
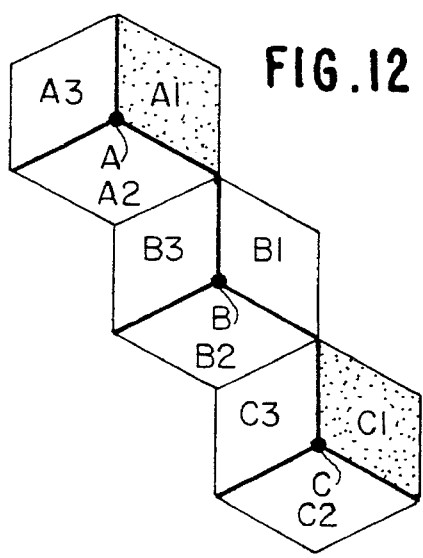
FIGS. 12(a) and 12(b) are diagrams illustrative of parallel and back-back beam channel allocation patterns for the conventional fixed channel allocation method in a sectoral zone configuration.
Figure 12B:
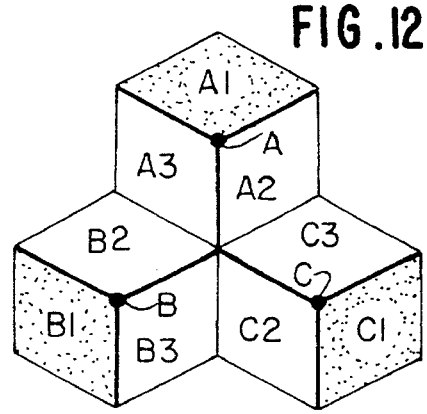

A channel allocation algorithm for the method according to the third embodiment will be described below with reference to FIG. 11. The channel allocation algorithm will be described with respect to sectoral zone X1 by way of example. In FIG. 11, channel group G1 (Gi, i=1) is channel group CHG1 shown in FIG. 3, i.e., includes channels 1, 4, 7, 10, and channel group G2 is the sum of sets of channel groups CHG2, CHG3, i.e., includes channels 2, 3, 5, 6, 8, 9, 11, 12. First, sectoral zone X1 selects one of the channels of channel group G1. If the selected channel is allocable, then the channel allocation algorithm is finished. If not allocable, then the sectoral zone X1 selects another of the channels from channel group G1. After all the channels of channel group G1 are selected, one of the channels of channel group G2 is repeatedly selected to find an allocable channel. If no allocable channel is found after all the channels of channel group G2 are selected, then a call loss occurs, and the channel allocation algorithm comes to an end.

According to the first embodiment, a call loss occurs if there is no allocable channel in one of the channel group per sectoral zone. According to the third embodiment, however, if there is no allocable channel in the channel group assigned to one sectoral zone, then an allocable channel is sought in the channel groups assigned to the other sectoral zones. Thus, while the method still maintains the advantage of the method according to the first embodiment by the preferential allocation of a channel from the channel group assigned to each sectoral zone, the method improves channel utilization efficiency due to the jumbo group effect that is effective for a reduced call loss probability by sharing channels between sectoral zones having different directions.

Figure 4:
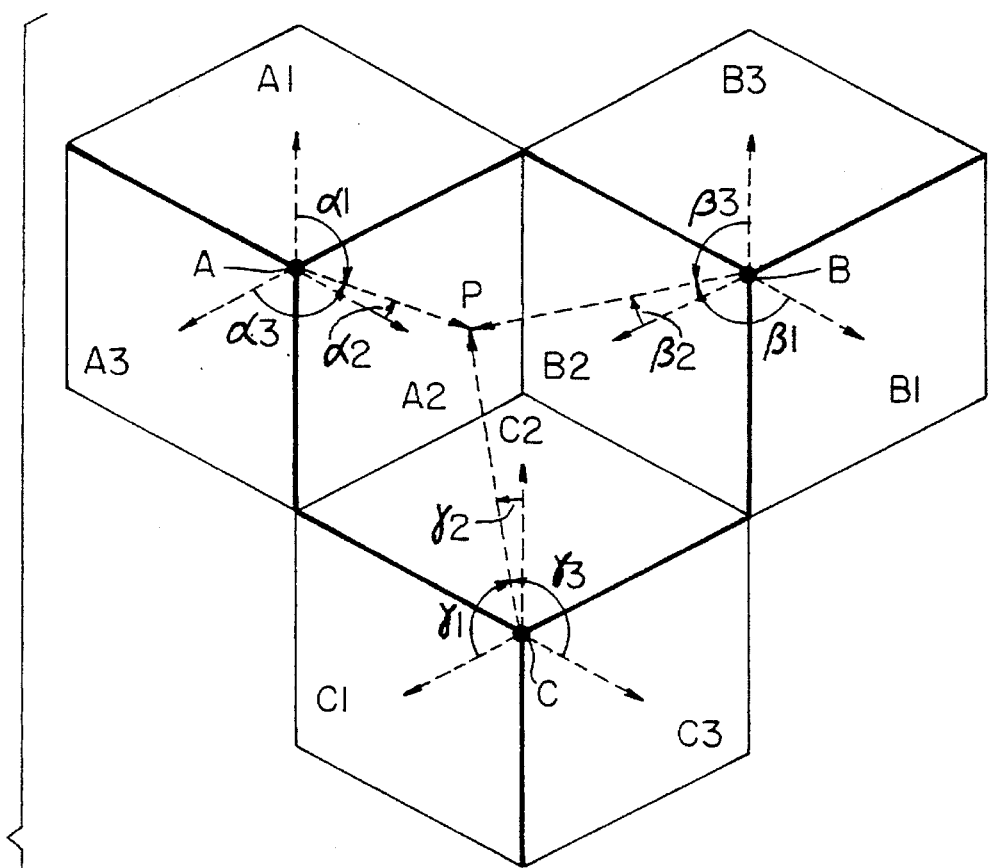
FIG. 4 shows a zone configuration of a mobile communication system to which the radio channel allocation method according to the fourth invention is applied and a plan of the preferential allocation channel groups assigned to sectoral zones including a selection order of the channel groups.

FIG. 4 shows a zone configuration of a mobile communication system to which a method of allocating radio channels according to a fourth invention is applied, a plan of the preferential allocation channel groups assigned to sectoral zones and the order of selection of the preferential allocation channel groups to the sectoral zones. The zone configuration of the mobile communication system and the preferential allocation channel groups assigned to the respective sectoral zones, i.e., channel group CHG1 assigned to sectoral zone X1 (X=A, B, C), channel group CHG2 assigned to sectoral zone X2, and channel group CHG3 assigned to sectoral zone X3, are identical to those shown in FIG. 2.

The channel allocation algorithm is the same as that in the third embodiment.

According to the second embodiment, a call loss occurs if no allocable channel is found in one of the channel group per sectoral zone. According to the fourth embodiment, however, if there is no allocable channel in the channel group assigned to one sectoral zone, then an allocable channel is sought in the channel groups assigned to the other sectoral zones. Thus, while the method still maintains the advantage of the method according to the second embodiment by the preferential allocation of a channel from the channel group assigned to each sectoral zone, the method improves channel utilization efficiency due to the jumbo group effect that causes a reduced call loss probability by sharing channels between sectoral zones covered by the same base station.

Figure 5:
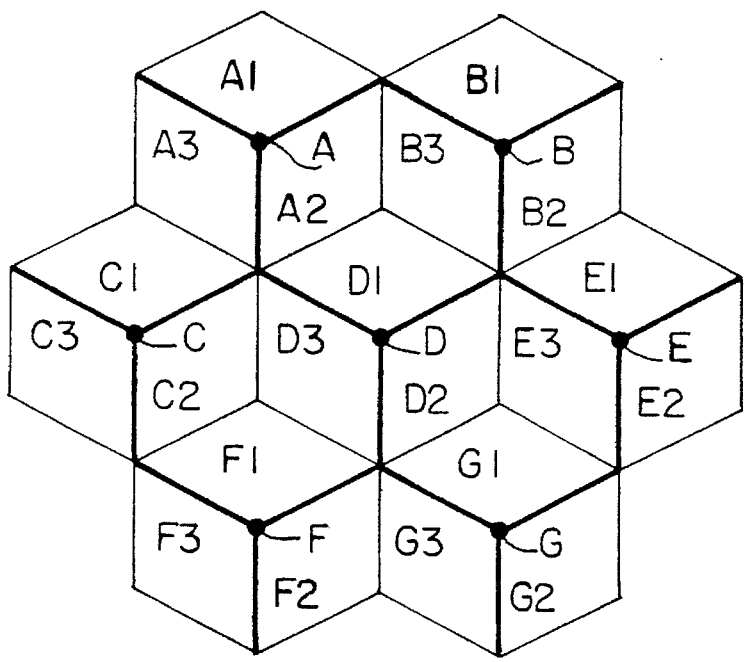
FIG. 5 shows a zone configuration of a mobile communication system to which the radio channel allocation method according to the fifth invention is applied and a plan of the preferential allocation channel groups assigned to sectoral zones including a selection order of channel subgroups.

FIG. 5 shows a zone configuration of a mobile communication system to which a method of allocating a radio channel according to a fifth invention is applied, a plan of the preferential allocation channel groups assigned to sectoral zones and the order of selection of channels in the channel groups. The zone configuration is the same as that shown in FIG. 1. There are available 10 channels 1, 2, . . . , 10 in the mobile communication system.

Since three sectoral zones belong to each base station, channels 1~10 are divided into three groups and assigned as the preferential allocation channel groups to the each sectoral zone. Some channels are given overlappingly to a plurality of the channel groups. For example, channels 1, 4, 7, 8, 10 make up a preferential allocation channel group assigned to sectoral zone A1, channels 2, 5, 7, 9, 10 make up a preferential allocation channel group assigned to sectoral zone A2, and channels 3, 6, 8, 9, 10 make up a preferential allocation channel group assigned to sectoral zone A3. According to this channel grouping, each of channels 1–6 is present in only one channel group, each of channels 7–9 is present overlappingly in two channel groups, and channel 10 is present overlappingly in three channel groups, and the channels are selected in order from the subgroup of channels 1–6, the subgroup of 7–9 and the subgroup of channel 10.

Inasmuch as the direction of sectoral zone B1 covered by base station B is substantially the same as that of sectoral zone A1, the channel group assigned to sectoral zone B1 includes mostly the same channels as those assigned to sectoral zone A1. Specifically, the preferential allocation channel group assigned to sectoral zone B1 includes channels 1, 4, 7, 8, 10. Similarly, the preferential allocation channel group assigned to sectoral zone B2 includes channels 2, 5, 7, 9, 10, and the preferential allocation channel group assigned to sectoral zone B3 includes channels 3, 6, 8, 9, 10. Likewise, the preferential allocation channel groups assigned to each of sectoral zones C1, D1, . . . , G1 are the same as the preferential allocation channel group assigned to sectoral zone A1, the preferential allocation channel groups assigned to each of sectoral zones C2, D2, . . . , G2 are the same as the preferential allocation channel group assigned to sectoral zone A2, and the preferential allocation channel groups assigned to each of sectoral zones C3, D3, . . . , G3 are the same as the preferential allocation channel group assigned to sectoral zone A3.

A channel allocation algorithm for the method according to the fifth embodiment will be described below with reference to FIG. 11. According to the fifth embodiment, the channels of the channel group assigned to each sectoral zone are divided into a plurality of sub-groups which are to be selected in due order. In the illustrated fifth embodiment, as shown in FIG. 5, the channels of the channel group assigned to each sectoral zone are divided into three subgroups. With respect to sectoral zone X1 (X=A, B, C, . . . , G), for example, channel group G1 in FIG. 11 includes the subgroup of channels 1, 4, channel group G2 includes the subgroup of channels 7, 8, and channel group G3 includes the subgroup of channel 10. First, sectoral zone X1 selects one of the channels from channel group G1. If the selected channel is allocable, then the channel allocation algorithm is finished. If not allocable, then sectoral zone X1 selects the other channel of channel group G1. After all the channels of channel group G1 are selected, one of the channels of channel group G2 is repeatedly selected to find an allocable channel. After all the channels of channel group G2 are selected, one of the channels of channel group G3 is repeatedly selected to find an allocable channel. If no allocable channel is found after all the channels of channel group G3 are selected, then a call loss occurs, and the channel allocation algorithm comes to an end.

According to the first embodiment, a call loss occurs if there is no allocable channel in the channel group assigned per sectoral zone, and according to the third embodiment, if there is no allocable channel in the channel group assigned to one sectoral zone, then an allocable channel is sought in the channel groups assigned to the other sectoral zones. If, however, the traffic intensity is increased in a certain sectoral zone, then the sectoral zone uses many channels allocated to the other sectoral zones. As a result, the advantage offered by the method according to the first invention may be lessened, lowering the overall channel utilization efficiency. According to the fifth embodiment, however, some channels are shared with other sectoral zones, and those channels which are not shared by other sectoral zones are selected with priority. Sharing some channels with other sectoral zones increases the jumbo group effect, and selection with priority of those channels which are not shared with other sectoral zones is effective to maintain the advantage offered by the method according to the first invention. Furthermore, since shared channels are limited to certain channels, even when the traffic intensity is increased in a certain sectoral zone, the advantage offered by the method according to the first invention is decreased to a lesser degree, and overall channel utilization efficiency is increased.

Figure 6:
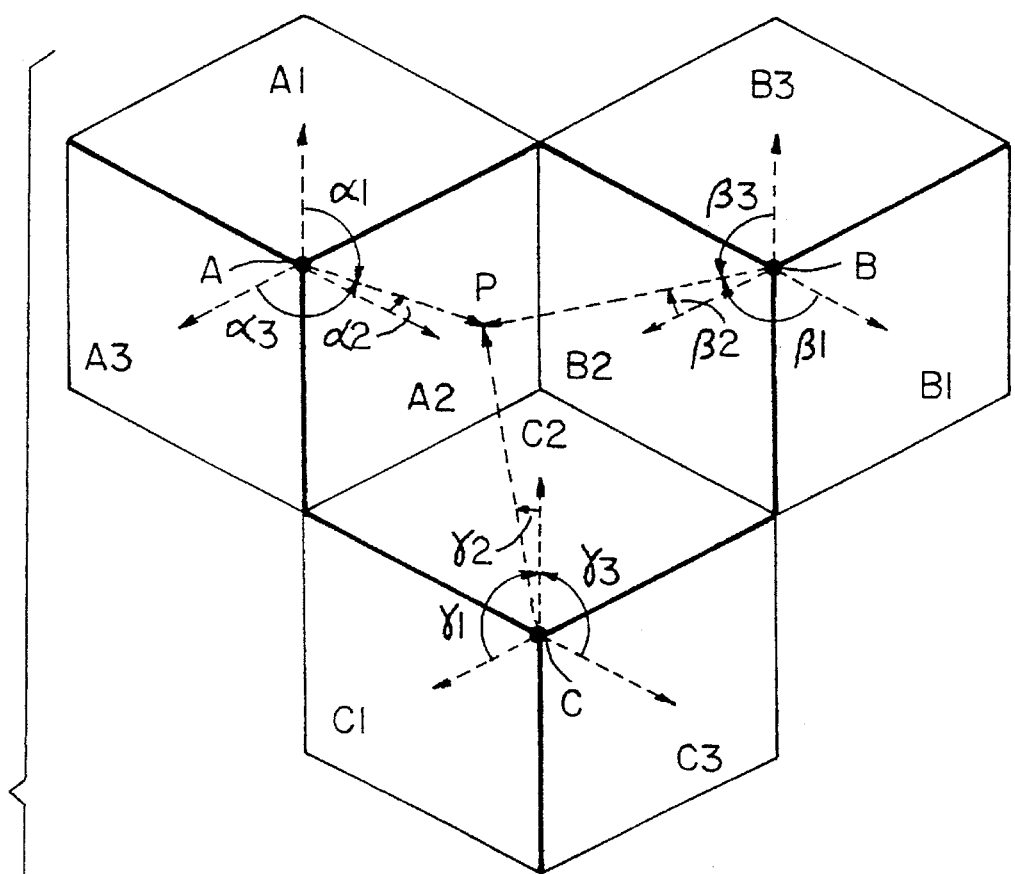
FIG. 6 shows a zone configuration of a mobile communication system to which the radio channel allocation method according to the sixth invention is applied and a plan of the preferential allocation channel groups assigned to sectoral zones including a selection order of channel subgroups.

In FIG. 6 the zone configuration is the same as that shown in FIG. 2. There are available 10 channels 1, 2, . . . , 10 in the mobile communication system. Since there are three sectoral zones per base station, the radio channels are divided into three groups. The channel configurations of the channel groups are the same as those in the fifth embodiment. An identical channel group is assigned to sectoral zones A1, B1, C1 in the same way as in the second embodiment. In this embodiment the channel group of channels 1, 4, 7, 8, 10 is assigned to sectoral zones A1, B1, C1. Similarly, the channel group of channels 2, 5, 7, 9, 10 is assigned to sectoral zones A2, B2, C2 and the channel group of channels 3, 6, 8, 9, 10 is assigned to sectoral zones A3, B3, C3. The channel allocation algorithm is the same as that in fifth embodiment.

According to the second embodiment, a call loss occurs if there is no allocable channel in the channel group assigned per sectoral zone, and according to the fourth invention, if there is no allocable channel in the channel group allocated to one sectoral zone, then an allocable channel is sought in the channel groups allocated to the other sectoral zones. If, however, the traffic intensity is increased in a certain sectoral zone other than an intensive traffic region, then the sectoral zone uses many channels allocated to the other sectoral zones. As a result, the advantage offered by the method according to the second invention may be lessened, lowering overall channel utilization efficiency. According to the sixth embodiment, however, some channels are shared with other sectoral zones covered by the same base station, and those channels which are not shared with other sectoral zones are selected with priority. Sharing some channels with other sectoral zones increases the jumbo group effect, and the selection with priority of those channels which are not shared with other sectoral zones is effective to maintain the advantage offered by the method according to the second invention. Furthermore, since shared channels are limited to certain channels, even when the traffic intensity is increased in a certain sectoral zone other than the intensive traffic region, the advantage offered by the method according to the second invention is decreased to a lesser degree, and the overall channel utilization efficiency is increased.

Figure 7:
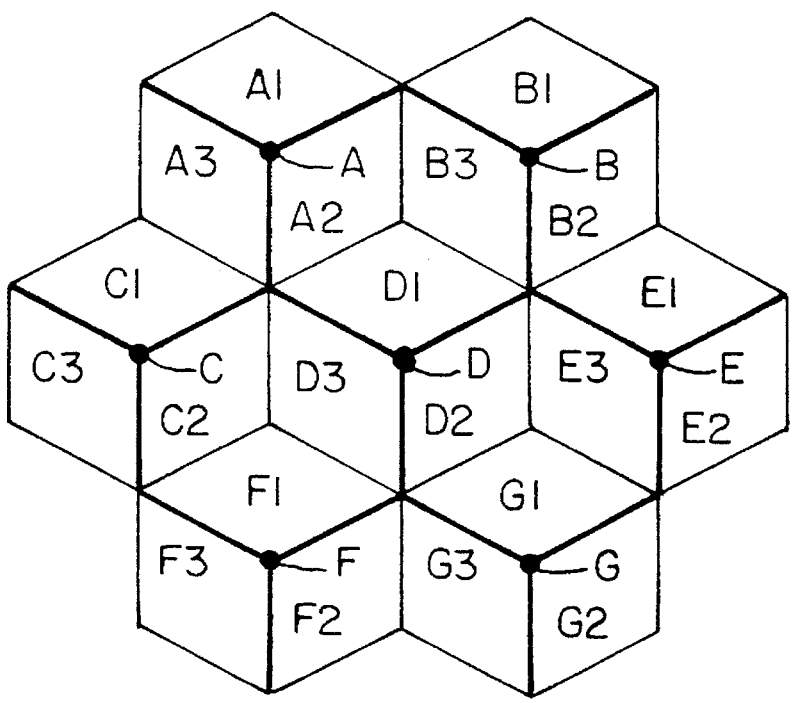
FIG. 7 shows a zone configuration of a mobile communication system to which the radio channel allocation method according to the seventh invention is applied and a plan of the preferential allocation channel groups assigned to sectoral zones including a selection order of the channel groups.

FIG. 7 shows a zone configuration of a mobile communication system to which a method of allocating a radio channel according to a seventh invention is applied and a plan of the preferential allocation channel groups assigned to sectoral zones including the selection order of the channel groups in the sectoral zones.

The zone configuration of the mobile communication system and the preferential allocation channel groups assigned to sectoral zones are identical to those shown in FIG. 1.

A channel allocation algorithm for the embodiment will be described below with reference to FIG. 11. The channel allocation algorithm will be described with respect to sectoral zone X1 by way of example. In FIG. 11, channel group G1 is channel group CHG1 shown in FIG. 7, i.e., channel group G1 includes channels 1, 4, 7, 10. In the embodiment, channel groups G2, G3 are the same in any sectoral zone X1. Therefore, channel group G2 is either channel group CHG2 or channel group CHG3. If channel group G2 is channel group CHG2, i.e., if it includes channels 2, 5, 8, 11, then channel group G3 is channel group CHG3, i.e., it includes channels 3, 6, 9, 12.

First, sectoral zone X1 selects one of the channels of channel group G1. If the selected channel is allocable, then the channel allocation algorithm is finished. If not allocable, then sectoral zone X1 selects another of the channels of channel group G1. After all the channels of channel group G1 are selected, one of the channels of channel group G2 is repeatedly selected to find an allocable channel. After all the channels of channel group G2 are selected, one of the channels of channel group G3 is repeatedly selected to find an allocable channel. If no allocable channel is found after all the channels of channel group G3 are selected, then a call loss occurs, and the channel allocation algorithm comes to an end.

According to the third embodiment, when a channel of the channel group assigned to another sectoral zone is allocated, if the selection orders of the assigned channel groups are different from each other between sectoral zones having the same direction, then the same channel may be allocated by those sectoral zones having different directions. As a result, the advantage offered by the method according to the first invention is lessened. According to the seventh embodiment, however, when the channel group assigned to another sectoral zone is used as a preferential allocation channel group, the same order of selection of preferential allocation channel groups is employed between sectoral zones having the same direction. Therefore, even when a channel from another channel group is allocated, the probability is increased that the same channel is allocated in sectoral zones having the same direction. Consequently, the advantage offered by the method according to the first embodiment is achieved. At the same time, the jumbo group effect is obtained for increased channel utilization efficiency.

Figure 8:
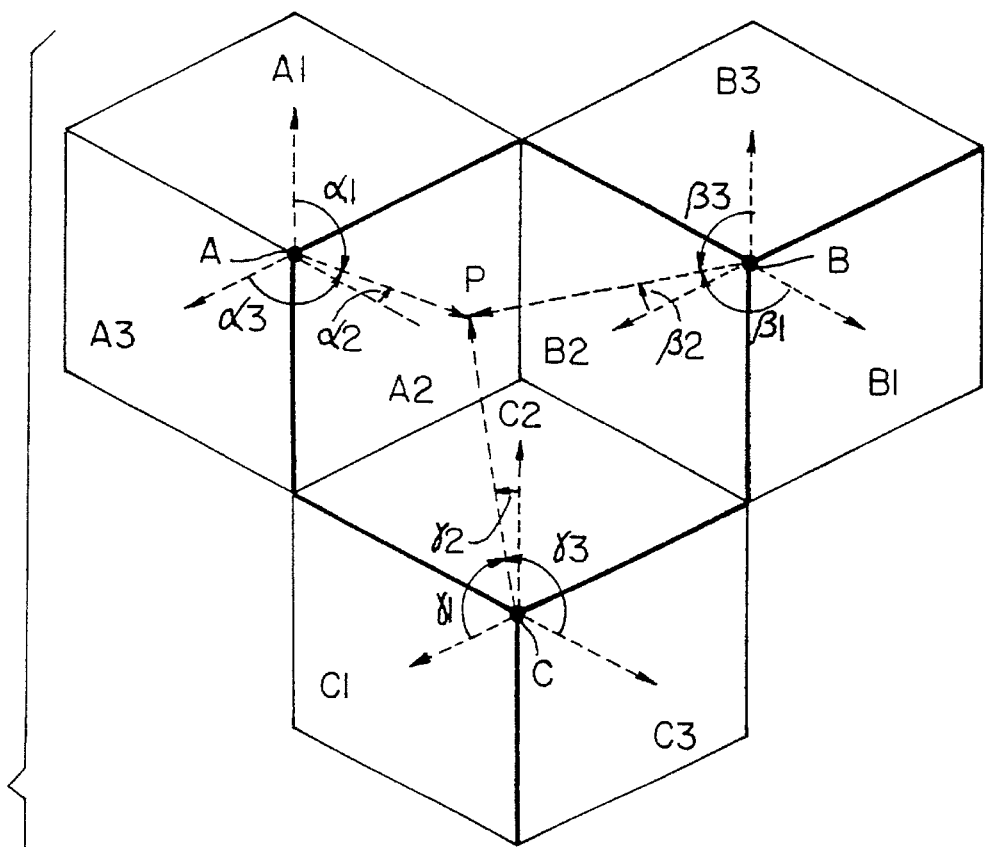
FIG. 8 shows a zone configuration of a mobile communication system to which the radio channel allocation method according to the eighth invention is applied and a plan of the preferential allocation channel groups assigned to sectoral zones including a selection order of the channel groups.

FIG. 8 shows a zone configuration of a mobile communication system to which a method of allocating a radio channel according to an eighth invention is applied and a plan of the preferential allocation channel groups assigned to sectoral zones including the selection order the channel groups in the sectoral zones. The zone configuration of the mobile communication system and the preferential allocation channel groups that are assigned to sectoral zones are identical to those of the second embodiment shown in FIG. 2. The channel allocation algorithm is identical to the channel allocation algorithm for the method according to the seventh embodiment.

According to the fourth embodiment, when a channel of the channel group assigned to another sectoral zone is selected, if the order of selection of the preferential allocation channel groups is random depending on the base station, then the channel selected from another channel group is frequently not the same as the channel repeatedly used in a sectoral zone whose direction is opposite the intensive traffic region. As a result, the advantage offered by the method according to the second invention is lessened. According to the embodiment, however, when the channel group assigned to another sectoral zone is selected, the same selection order of the preferential allocation channel groups is employed between sectoral zones where the differences between their directions and the direction toward the intensive traffic region from each base station are substantially similar to each other. Therefore, even when a channel is allocated from the channel group assigned to another sectoral zone, the probability is increased that the same channel is allocated in sectoral zones having the direction opposite the intensive traffic region. Consequently, the advantage offered by the method according to the second invention is achieved. At the same time, the jumbo group effect is obtained for increased channel utilization efficiency.

Figure 9:
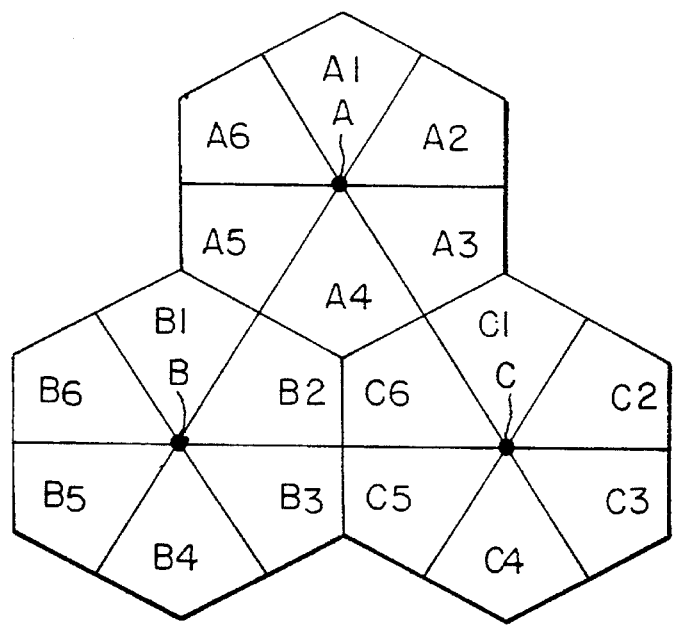
FIG. 9 shows a zone configuration of a mobile communication system to which the radio channel allocation method according to the ninth invention is applied and a plan of the preferential allocation channel groups assigned to sectoral zones including a selection order of the channel groups.

FIG. 9 shows a zone configuration of a mobile communication system to which a method of allocating a radio channel according to a ninth invention is applied and a plan of the preferential allocation channel groups assigned to sectoral zones including the orders of selection of the channel groups in the sectoral zones. The mobile communication system has a plurality of base stations A, B, C, and a plurality of sectoral zones A1, A2, . . . , A6, B1, B2, . . . , B6, C1, C2, . . . , C6 which are covered by respective base stations A, B, C. There are available 18 channels 1, 2, . . . , 18 in the mobile communication system. Base station A has a plurality of antennas each having a sectoral directivity pattern in a horizontal plane, the antennas being directed toward the respective sectoral zones A1, A2, . . . , A6. The sectoral zones B1, B2, . . . , B6 covered by base station B are arranged such that they have sectoral antenna directivity patterns whose directions are substantially the same as those in sectoral zones A1, A2, . . . A, respectively. The sectoral zones covered by base station C are also similarly arranged.

Since six sectoral zones belong to each of the base stations, channels 1~18 are divided into six groups that are assigned as the preferential allocation channel groups to the sectoral zones. For example, as shown in FIG. 9, channels 1, 7, 13 make up a preferential allocation channel group assigned to sectoral zone A1, and channels 2, 8, 14 make up a preferential allocation channel group assigned to sectoral zone A2. Inasmuch as the direction of sectoral zone B1 covered by base station B is substantially the same as that of sectoral zone A1, the channel group allocated to sectoral zone B1 includes mostly the same channels as those allocated to sectoral zone A1. Specifically, the preferential allocation channel group assigned to sectoral zone B1 includes channels 1, 7, 13. Similarly, the preferential allocation channel groups assigned to sectoral zones B2, C1, C2 are the same as those allocated to sectoral zones A2, A1, A2, respectively.

The channel allocation algorithm shown in FIG. 11 for the method according to the ninth embodiment will be described below with respect to sectoral zone X1 (X=A, B, C), for example. In FIG. 11, channel group G1 is the preferential allocation channel group CHG1 shown in FIG. 9, i.e., it includes channels 1, 7, 13. Channel group G2 is the preferential allocation channel group assigned to a sectoral zone which has the least difference in direction from sectoral zone X1 to which channel group CHG1 is assigned as the preferential allocation channel group. Since the sectoral zones having the least difference in direction from sectoral zone X1 are sectoral zones X2 and X6, channel group CHG2 or CHG6 is selected as channel group G2. In this embodiment, channel group G2 serves as channel group CHG2, and hence a channel group G3 serves as channel group CHG6. Channel group G4 is either a channel group CHG3 or CHG5 assigned as the preferential allocation channel group to the sectoral zone X3 or X5, respectively, that has the next smallest difference in direction from the direction of sectoral zone X1 after sectoral zones X2 or X6. In this embodiment, channel group G4 serves as channel group CHG3 and hence channel group G5 serves as channel group CHG5. A channel group G6 serves as the remaining channel group CHG4.

First, sectoral zone X1 selects one of the channels of channel group G1. If the selected channel is allocable, then the channel allocation algorithm is finished. If not allocable, then sectoral zone X1 selects another of the channels of channel group G1. After all the channels of channel group G1 are selected, one of the channels of channel group G2 is repeatedly selected to find an allocable channel. After all the channels of channel group G2 are selected, channels of channel groups G3, G4, G5, G6 are successively selected. If no allocable channel is found after all the channels of channel group G6 are selected, then a call loss occurs, and the channel allocation algorithm comes to an end.

According to the third embodiment, when a channel of the channel group assigned to another sectoral zone is allocated, the same channel is allocated in sectoral zones having different directions, with the result that the advantage offered by the first invention is lessened. According to the ninth embodiment, when a channel of the channel group assigned to another sectoral zone is allocated, channels are successively selected from the channel groups assigned to the sectoral zones where the difference between their directions is small, i.e., from adjacent sectoral zones. Therefore, even when a channel of the channel group assigned to another sectoral zone is allocated, the difference between the directions of the sectoral zones covered by the different base stations, which uses the same channel, is minimized. Since the difference between the directions in which the carrier and interference waves arrive is reduced, the same advantage as that of the first invention can be obtained as well as the jumbo group effect, resulting in increased channel utilization efficiency. In particular, where the number of sectoral zones per base station is large, a channel of the channel group assigned to the different sectoral zone is more frequently used. Inasmuch as the angular difference between adjacent sectoral zone is small, however, a large advantage is obtained by using with priority a channel of the channel group assigned to the adjacent sectoral zone.

Figure 10:
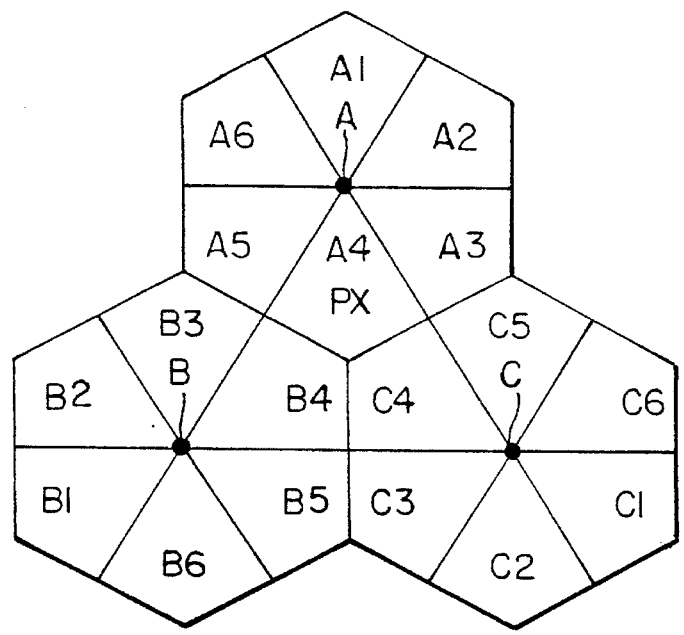
FIG. 10 shows a zone configuration of a mobile communication system to which the radio channel allocation method according to the tenth invention is applied and a plan of the preferential allocation channel groups assigned to sectoral zones including a selection order of the channel groups.

FIG. 10 shows a zone configuration of a mobile communication system to which a method of allocating a radio channel according to a tenth invention is applied and a plan of the preferential allocation channel groups assigned to sectoral zones including the orders of selection of the channel groups in the sectoral zones. The mobile communication system has a plurality of base stations A, B, C, and a plurality of sectoral zones A1, A2, ... A6, B1, B2, ..., B6, ..., C1, C2, ..., C6 which are covered by the respective base stations A, B, C. There are available 18 channels 1, 2, ..., 18 in the mobile communication system. Base station A has a plurality of antennas each having a sectoral directivity pattern in a horizontal plane, the antennas being directed toward each of sectoral zones A1, A2, ..., A6. Sectoral zones B1, B2, B3, B4, B5, B6 covered by base station B are arranged such that they have sectoral antenna directivity patterns whose directions are substantially the same as those in sectoral zones A5, A6, A1, A2, A3, A4, respectively. Sectoral zones C1, C2, C3, C4, C5, C6 covered by base station C are arranged such that they have sectoral antenna directivity patterns whose directions are substantially the same as those in sectoral zones A3, A4, A5, A6, A1, A2, respectively.

Since six sectoral zones belong to each of the base stations, channels 1~18 are divided into six groups that are assigned as the preferential allocation channel groups to each of the sectoral zones. For example, as shown in FIG. 10, channels 1, 7, 13 make up a preferential allocation channel group CHG1 assigned to sectoral zone A1, and channels 2, 8, 14 make up a preferential allocation channel group CHG2 assigned to sectoral zone A2.

As with the second embodiment, the angle from the direction of a sectoral zone used as a reference direction to the direction from the base station toward point P is considered. Since the difference between such angles is small with respect to sectoral zone X1 (X=A, B, C), the preferential allocation channel group assigned to each sectoral zone X1 contains many identical channels. Similarly, inasmuch as the difference between such angles is small with respect to sectoral zones X2, X3, X4, X5, X6, the preferential allocation channel groups assigned to these sectoral zones X2, X3, X4, X5, X6 also contain many identical channels. Specifically, the channel groups assigned for preferential allocation are channel group CHG1 for sectoral zone X1, and channel group CHG2 for sectoral zone X2.

The channel allocation algorithm for the method according to the tenth embodiment is the same as the channel allocation algorithm for the method according to the ninth embodiment.

According to the fourth embodiment, when a channel of the channel group assigned to another sectoral zone is allocated, the same channel is allocated in sectoral zones whose directions are oriented toward and away from the intensive traffic region, with the result that the advantage offered by the second invention is lessened. According to the tenth embodiment, when a channel of the channel group assigned to another sectoral zone is allocated, the channels are successively selected from the channel groups assigned to the sectoral zones having little difference in direction, i.e., to adjacent sectoral zones, at each base station. Therefore, even when a channel of the channel group assigned to another sectoral zone is used, the same channel is repeatedly used in sectoral zones whose directions opposite the intensive traffic region are relatively close to each other. Furthermore, channels are shared between sectoral zones whose directions of antenna directivity toward the intensive traffic region are relatively close to each other. Consequently, the same advantage as that of the second invention can be obtained as well as the jumbo group effect, resulting in increased channel utilization efficiency. In particular, where the number of sectoral zones per base station is large, a channel of the channel group assigned to the different sectoral zone is frequently allocated. Inasmuch as the angular difference of adjacent sectoral zones is small, however, a large advantage is obtained by using with priority a channel of the channel group assigned to the adjacent sectoral zone.

The first through tenth inventions, as described in above embodiment, offer the following advantages:

According to the first invention, the distance for repeatedly using the same channel in the sectoral zones having the same direction (defined by the antenna directivity) is shortened, and the distance for repeating the same channel in the sectoral zones having the perpendicular direction is also shortened, and the channel utilization efficiency increases to accommodate more traffic.

According to the second invention, since the same channel is repeatedly used in the sectoral zones having directions opposite the direction toward the intensive traffic region, the distance for reusing the same channel can be shortened in those sectoral zones. Since the number of channels that can be used in the sectoral zones having the directions toward the intensive traffic region is also increased, the channel utilization efficiency in the intensive traffic region is increased, with the result that more traffic can be accommodated.

According to the third invention, the advantage offered by the first invention is maintained, and channel utilization efficiency is improved, with the result that more traffic can be accommodated due to the jumbo group effect which results in reduced call loss probability by sharing channels between sectoral zones having different directions.

According to the fourth invention, the advantage offered by the second invention is maintained and channel utilization efficiency is improved, with the result that more traffic can be accommodated due to the jumbo group effect that brings about reduced call loss probability by sharing channels between different sectoral zones belonging to the same base station.

According to the fifth invention, some of the preferential allocation channels are shared with another sectoral zone, and those channels that are not shared with another sectoral zone are selected with priority, thereby increasing the jumbo group effect. Since the advantage offered by the first invention is also maintained, channel utilization efficiency is improved to accommodate more traffic.

According to the sixth invention, some of the preferential allocation channels are shared with another sectoral zone, and those channels that are not shared with another sectoral zone are selected with priority, thereby increasing the jumbo group effect. Since the advantage offered by the second invention is also maintained, channel utilization efficiency in the intensive traffic region is improved to accommodate more traffic.

According to the seventh invention, the same order of selection of the preferential allocation channel groups is employed in those sectoral zones which have the same directions. Therefore, even when the channel group assigned to another sectoral zone is selected as a preferential allocation channel group, the probability is increased that the same channel is allocated in the sectoral zones having the same direction. Consequently, the advantage offered by the method according to the first invention is achieved with the jumbo group effect, resulting in increased channel utilization efficiency to accommodate more traffic.

According to the eighth invention, the same order of selection of the preferential allocation channel groups is employed in those sectoral zones where the differences between directions of antenna directivity and the direction toward the intensive traffic region are similar to each other. Therefore, even when a channel from the channel group assigned to another sectoral zone is selected, the probability is increased that the same channel is allocated in the sectoral zones having the direction opposite to the intensive traffic region. Consequently, the advantage offered by the method according to the second invention is achieved with the channel jumbo group effect, resulting in increased channel utilization efficiency in the intensive traffic region to accommodate more traffic.

According to the ninth invention, when a channel is selected from the channel group assigned to another sectoral zone, the channels are successively selected from the preferential allocation channel group assigned to the sectoral zone having a small difference in direction. Therefore, even when a channel of the channel group assigned to another sectoral zone is allocated, the advantage offered by the first invention can be obtained as well as the jumbo group effect, resulting in increased channel utilization efficiency to accommodate more traffic.

According to the tenth invention, when a channel is selected from the channel group assigned to another sectoral zone, the channels are successively selected from the preferential allocation channel group assigned to the sectoral zones having a small difference in directions. Therefore, even when a channel of the channel group assigned to another sectoral zone is used, the advantage offered by the second invention can be obtained as well as the jumbo group effect, resulting in increased channel utilization efficiency in the intensive traffic region to accommodate more traffic.

While the number of sectoral zones per base station is 3 or 6 and the total number of channels is 10, 12, or 18 in the above illustrated embodiments, more or fewer sectoral zones or channels may be employed.

Although certain preferred embodiments of the present invention have been shown and described in detail, it should be understood that various changes and modifications may be made therein without departing from the scope of the appended claims.

What is claimed is:

1. A method of allocating radio channels in a mobile communication system comprising base stations, each base station having a plurality of sectoral zones whose direction is defined by a directional antenna located at the base station, said method comprising the steps of:

dividing all of the available radio channels for said system into a number of radio channel groups equal to the number of sectoral zones per base station;

assigning each of said radio channel groups to said sectoral zones so that one of said radio channel groups is assigned as a preferential allocation channel group to each of said sectoral zones whose directions are substantially the same; and when a request for communication occurs between a base station and a mobile station positioned in a sectoral zone covered by said base station, testing a carrier-to-interference power ratio of a selected radio channel from the preferential allocation channel group assigned to said sectoral zone; and allocating the selected radio channel which has a carrier-to-interference power ratio equal to or greater than a predetermined value;

whereby a number of identical radio channels are allocated to the sectoral zones having substantially the same direction in many of the base stations.

2. A method according to claim 1, wherein if no allocable radio channel is selected from said preferential allocation channel group, radio channels are selected from the preferential allocation channel groups assigned to different sectoral zones.

3. A method according to claim 2, wherein when radio channels are selected from the preferential allocation channel groups assigned to different sectoral zones, the radio channels are selected in the same order in said different sectoral zones whose directions are substantially similar.

4. A method according to claim 2, wherein when radio channels are selected for a sectoral zone from the preferential allocation channel groups assigned to different sectoral zones, the radio channels are selected in order from the preferential allocation channel groups assigned to sectoral zones having the least difference in direction from said sectoral zone.

5. A method according to claim 1, wherein at least one of the radio channels are assigned overlappingly to different preferential allocation channel groups, and when radio channels are selected from one preferential allocation channel group, said radio channels are selected in order from the channels which are assigned to the smallest number of the preferential allocation channel groups.

6. A method of allocating radio channels in a mobile communication system comprising base stations, each base station having a plurality of sectoral zones whose direction is defined by a directional antenna located at the base station, said method comprising the steps of:

dividing all of the available radio channels for said system into a number of radio channel groups equal to the number of sectoral zones per base station;

assigning each of said radio channel groups as a preferential allocation channel group to each sectoral zone in at least two neighboring base stations where angles formed between the directions of said sectoral zones and the directions toward a given region from said base stations are substantially similar; and when a request for communication occurs between a base station and a mobile station positioned in a sectoral zone covered by said base station, testing a carrier-to-interference power ratio of a selected radio channel from the preferential allocation channel group assigned to said sectoral zone; and allocating the selected radio channel which has a carrier-to-interference power ratio equal to or greater than a predetermined value;

whereby a number of identical radio channels are allocated to the sectoral zones where said angles are substantially similar.

7. A method according to claim 6, wherein if no allocable radio channel is selected from said preferential allocation channel group, radio channels are selected from the preferential allocation channel groups assigned to different sectoral zones.

8. A method according to claim 7, wherein when radio channels are selected from the preferential allocation channel groups assigned to different sectoral zones, the radio channels are selected in the same order in said different sectoral zones where said angles are substantially similar.

9. A method according to claim 7, wherein when radio channels are selected for a sectoral zone from the preferential allocation channel groups assigned to different sectoral zones, the radio channels are selected in order from the preferential allocation channel groups assigned to sectoral zones having the least difference in direction from said sectoral zone.

10. A method according to claim 6, wherein at least one of the radio channels are assigned overlappingly to different preferential allocation channel groups, and when radio channels are selected from one preferential allocation channel group, said radio channels are selected in order from the channels which are assigned to the smallest number of the preferential allocation channel groups.

* * * * *